(12) United States Patent
Poli (10) Patent No.: US 11,756,052 B2
(45) Date of Patent: Sep. 12, 2023

(54) PERSONAL PROGRAM SOURCE VALIDATION SYSTEM

(71) Applicant: ARRIS Enterprises LLC, Suwanee, GA (US)

(72) Inventor: Christopher Poli, Doylestown, PA (US)

(73) Assignee: ARRIS Enterprises LLC, Suwanee, GA (US)

(*) Notice: Subject to any disclaimer, the term of this patent is extended or adjusted under 35 U.S.C. 154(b) by 3 days.

(21) Appl. No.: 17/215,124

(22) Filed: Mar. 29, 2021

(65) Prior Publication Data

US 2021/0304223 A1 Sep. 30, 2021

Related U.S. Application Data

(60) Provisional application No. 63/001,792, filed on Mar. 30, 2020.

(51) Int. Cl.
*G06Q 30/018* (2023.01)
*H04N 21/61* (2011.01)
*H04N 21/858* (2011.01)
*H04N 21/431* (2011.01)

(52) U.S. Cl.
CPC ..... *G06Q 30/0185* (2013.01); *H04N 21/4312* (2013.01); *H04N 21/6125* (2013.01); *H04N 21/8586* (2013.01)

(58) Field of Classification Search
CPC .......... G06Q 30/0185; H04N 21/4312; H04N 21/6125; H04N 21/8586; H04N 21/278; H04N 21/4532; H04N 21/4622; H04N 21/4755; H04N 21/4821; H04N 21/4826
See application file for complete search history.

(56) References Cited

U.S. PATENT DOCUMENTS

| | | | | |
|---|---|---|---|---|
| 8,185,448 | B1* | 5/2012 | Myslinski | G06Q 30/018 705/26.1 |
| 8,583,509 | B1* | 11/2013 | Myslinski | H04L 51/52 705/26.1 |
| 2012/0233640 | A1* | 9/2012 | Odryna | H04N 21/4312 725/45 |
| 2013/0262575 | A1* | 10/2013 | Xiong | H04N 21/47202 709/204 |
| 2013/0308920 | A1* | 11/2013 | Myslinski | H04L 51/02 386/240 |
| 2013/0311388 | A1* | 11/2013 | Myslinski | G06Q 30/0625 705/317 |

(Continued)

*Primary Examiner* — Fernando Alcon
(74) *Attorney, Agent, or Firm* — Chernoff, Vilhauer, McClung & Stenzel, LLP (57) ABSTRACT

A system includes a factual bias database accessible by a computing device that includes a media set of media sources and a factual set of factual ratings, where each of the media sources includes an associated factual rating and/or bias rating. The computing device includes a display associated therewith that simultaneously renders a plurality of media contents. The computing device determining a source of each of said plurality of media contents and an associated factual rating for each of the media contents based upon a respective source. The computing device renders a plurality of indicators, each of which is associated with a corresponding one of the plurality of media contents, indicating a factual truth measure of respective media contents.

14 Claims, 7 Drawing Sheets

(56) References Cited

U.S. PATENT DOCUMENTS

| | | | |
|---|---|---|---|
| 2014/0047335 A1* | 2/2014 | Lewis | H04N 21/26258 |
| | | | 715/716 |
| 2014/0130092 A1* | 5/2014 | Kunisetty | H04N 21/4828 |
| | | | 725/40 |
| 2015/0019465 A1* | 1/2015 | Littlejohn | H04B 1/1027 |
| | | | 455/184.1 |
| 2016/0253710 A1* | 9/2016 | Publicover | H04N 21/4532 |
| | | | 705/14.66 |
| 2018/0239832 A1* | 8/2018 | Galuten | G06F 16/9535 |
| 2019/0082224 A1* | 3/2019 | Bradley | G06Q 30/0282 |
| 2019/0099653 A1* | 4/2019 | Wanke | G06Q 30/0203 |
| 2019/0147062 A1* | 5/2019 | Kim | G06F 16/9536 |
| | | | 707/748 |
| 2019/0163327 A1* | 5/2019 | Otero | G06F 3/0482 |
| 2019/0213423 A1* | 7/2019 | Haberstroh | H04N 21/41407 |
| 2020/0053409 A1* | 2/2020 | Abed | H04N 21/23418 |
| 2021/0103626 A1* | 4/2021 | Jolly | G06F 16/345 |
| 2021/0200903 A1* | 7/2021 | Singh | G06F 21/645 |

* cited by examiner

| L | L | C | R | R |
|---|---|---|---|---|
| ALTERNET | The Atlantic | AP | Fox News Online news only | THE AMERICAN SPECTATOR |
| CNN opinion | BuzzFeed NEWS | BBC | reason | BREITBART |
| DEMOCRACY NOW! | CBS | Bloomberg | | THE BLAZE |
| THE DAILY BEAST | CNN Online news only | The Christian Science Monitor | THE WALL STREET JOURNAL opinion | CBN |
| THE HUFFINGTON POST | The Economist | npr Online news only | | THE DAILY CALLER |
| The Intercept | theguardian | REUTERS | Examiner | Daily Mail |
| JACOBIN | NBC | THE HILL | The Washington Times | DAILY WIRE |
| Mother Jones | The New York Times Online news only | USA TODAY | | Fox News opinion |
| msnbc | npr opinion | THE WALL STREET JOURNAL Online news only | THE SPECTATOR | the FEDERALIST |
| THE NEW YORKER | POLITICO | FINANCIAL EXPRESS | THE SUMTER ITEM | NATIONAL REVIEW |
| The New York opinion Times | TIME | FINANCIAL TIMES | TOLEDO BLADE | NEW YORK POST |
| The Nation | The Washington Post | GALLUP | | Newsmax |
| SLATE | MIAMI HERALD | GLOBAL SLAVERY INDEX | | JEWISH POLICY CENTER |
| Vox | MINNESOTA PUBLIC RADIO | | | KANSAS POLICY INSTITUTE |
| BEING LIBERAL | | | | LIFE NEWS |
| BAY AREA REPORTER | | | | LOZIER INSTITUTE |

DATA SOURCE SELECTION

☑ SOURCE A

☐ SOURCE B

☑ SOURCE C

☐ SOURCE D

☐ SOURCE E

SELECT

PERSONAL PROGRAM SOURCE VALIDATION SYSTEM

CROSS REFERENCE TO RELATED APPLICATIONS

This application claims benefit of U.S. Provisional Patent Application No. 63/001,792, filed Mar. 30, 2020.

BACKGROUND

The subject matter of this application relates to a media content source validation system.

Users of various media content available on the Internet or otherwise, in the form of video content, audio content, graphical content, and/or textual content, obtain such media content from a variety of different sources. For example, video content may be available from video sources, such as YouTube and news websites.

Often media content is initially presented in the form of concatenated information from many different sources, such as various media outlets. For example, video content on various topics is readily available from YouTube, Instagram, Facebook, and news related organizations that each obtain information from multiple sources. For example, video content on various topics is readily available from cable networks and television networks, with the video content often being indexed in some manner using an electronic program guide. For example, audio content is available on podcasts, Instagram, Facebook, and news related organizations that each obtain information from multiple sources. For example, graphical content is available on websites, Instagram, Facebook, and news related organizations that each obtain information from multiple sources. For example, textual content is available on websites, Instagram, Facebook, and news related organizations that each obtain information from multiple sources.

One of the outstanding issues for such media content is whether or not such media content is factually correct or factually incorrect. For a user to determine whether any particular content is factually correct or not factually correct is problematic, often requiring time consuming research. In addition, for a user to determine whether any particular source of the content is typically factually correct or not typically factually correct is problematic, often requiring research into whether the particular source of the content is typically factually correct or not.

What is desired, therefore, is an effective manner of determining the factual correctness of media content.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

An increasing number of users consuming news and other media content from a variety of sources has resulted in a rise of misinformation. Many factually correct news stories are presented as legitimate. Many factually false news stories are presented as if they are legitimate. While such factually false news stories may be presenting false information as legitimate, it is difficult to determine the nature of the falsity of the information without incurring a time-consuming investigation. One technique to determine the nature of the falsity of the information is to use professional fact checkers to determine which content is false, and upon making such a falsity determination, tagging the content with a warning and directly censoring the false content. Also, the professional fact checkers may correct the false information and replace it with factually correct information to reduce the continued influence of such misinformation. However, often the time necessary for professional fact checking of such content is substantial, resulting in either such factually false information being available for a substantial amount of time while spreading false information, and in most cases due to the sheer volume of such factually false information it will never be corrected or otherwise tagged with the warning.

With the difficulty of determining and/or correcting the factual accuracy of particular content from a particular source, it is preferable to more broadly determine the anticipated factual reliability of media content based upon the source of the content. In this manner, individual media content does not need to be analysed for its factual accuracy. In this manner, all of the media content from a particular source may be treated in a similar manner.

Figure 1:
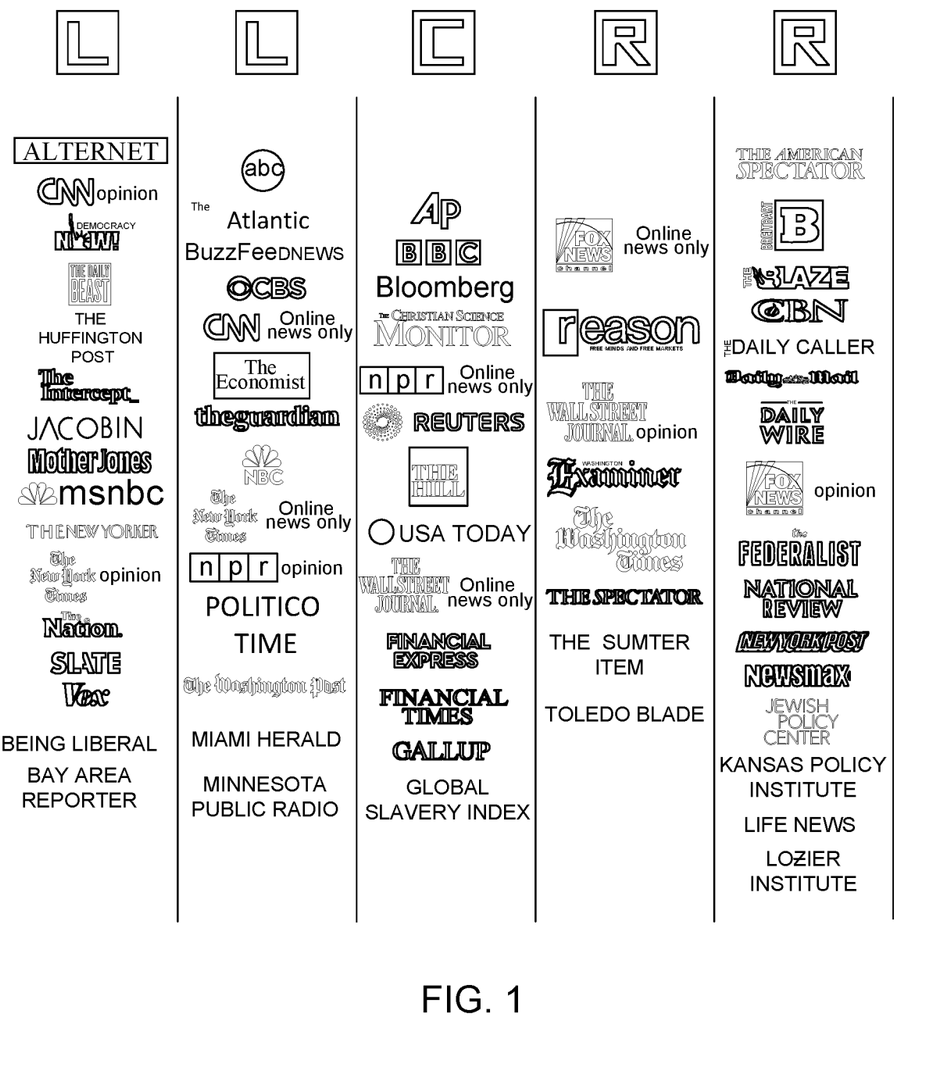
FIG. 1 illustrates a set of media contents and associated factual bias.

Referring to FIG. 1, the falsity characteristics of some content, generally referred to as a rating, may be related to political content which tends to have a political bias that is generally inherent in the author's perspective. In general, the bias refers to whether the content is factual, non-factual, mixed nature, or otherwise. The bias may be considered along a continuum that may include, for example, left wing, leaning left wing, centrist, leaning right wing, and right wing.

By way of example, left wing may include sources such as ALTERNET, CNN opinion, Democracy NOW!, The Daily BEAST, The Huffington Post, The Intercept, JACOBIN, Mother Jones, MSNBC, The New Yorker, The New York Times opinion, The Nation, Slate, Vox, Being Liberal, and Bay Area Reporter.

By way of example, leaning left wing may include sources such as ABC, The Atlantic, Buzz Feed News, CBS, CNN online news only, The Economist, The Guardian, NBC, The New York Times online news only, NPR opinion, Politico, Time, The Washington Post, Miami Herald, and Minnesota Public Radio.

By way of example, centrist may include sources such as AP, BBC, Bloomberg, The Christian Science Monitor, NPR online news only, Reuters, The Hill, USA Today, The Wall Street Journal online news only, Financial Express, Financial Times, Gallup, and Global Slavery Index.

By way of example, leaning right wing may include sources such as Fox News online news only, Reason, The Wall Street Journal opinion, Washington Examiner, The Washington Times, The Spectator, The Sumter Item, and Toledo Blade.

By way of example, right wing may include sources such as The American Spectator, Breitbart, Blaze, CBN, The Daily Caller, Daily Mail, Daily Wire, Fox News opinion, The Federalist, National Review, New York Post, Newsmax, Jewish Policy Center, Kansas Policy Institute, Life News, and Lozier Institute.

As it may be observed, some of the content from the same general source is categorized into multiple categories. For example, "The New York Times opinion" may be rated as left wing, while "The New York Times online news only" may be rated leaning left wing.

Figure 2:
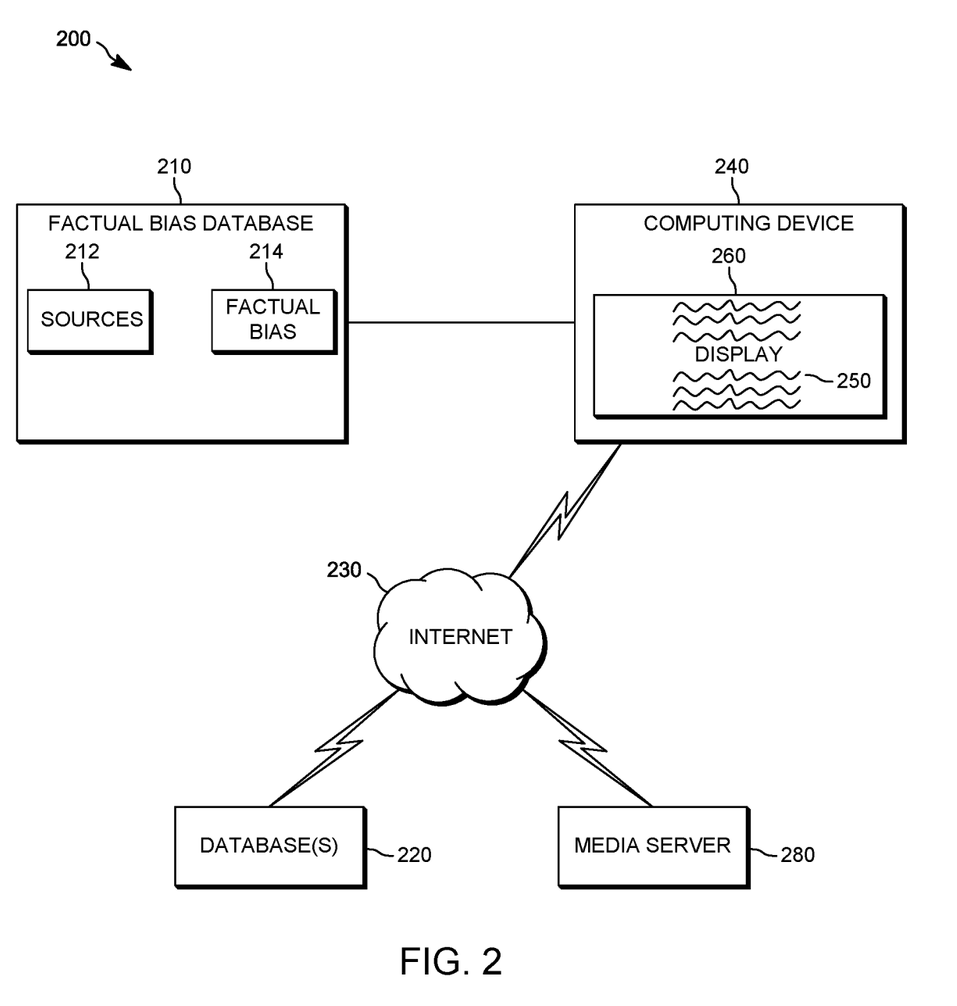
FIG. 2 illustrates a personalized factual checking system.

Referring to FIG. 2, a personalized factual checking system 200 for media content may include a factual bias database 210 that includes a listing of media content sources 212, such as by name or by link, and an associated factual bias 214 for each name or link. The factual bias database may be generally any group of information arranged in any manner. The factual bias database 210 may be updated on a periodic basis. The personalized factual checking system 200 for media content may use network-based databases 220, such as accessible through the Internet 230. A user may use a computing device 240 that includes a processor, such as a mobile phone, a tablet, a laptop computer, a desktop computer, a television, a set top box, any of which in combination with a display 260, or otherwise, to access media content 250 in combination with one or more of the databases 210, 220. The media content 250 may be obtained from any source, such as a network-based media server 280 accessible through the Internet 230. In addition, the computing device may be in the form of a server, such as a head end to a cable network, that provides information suitable to be rendered on a user's display device, such as a television. Preferably, the information to be rendered is in the form of an electronic programming guide (and/or includes any application that presents the content summary to the user).

Figure 3:
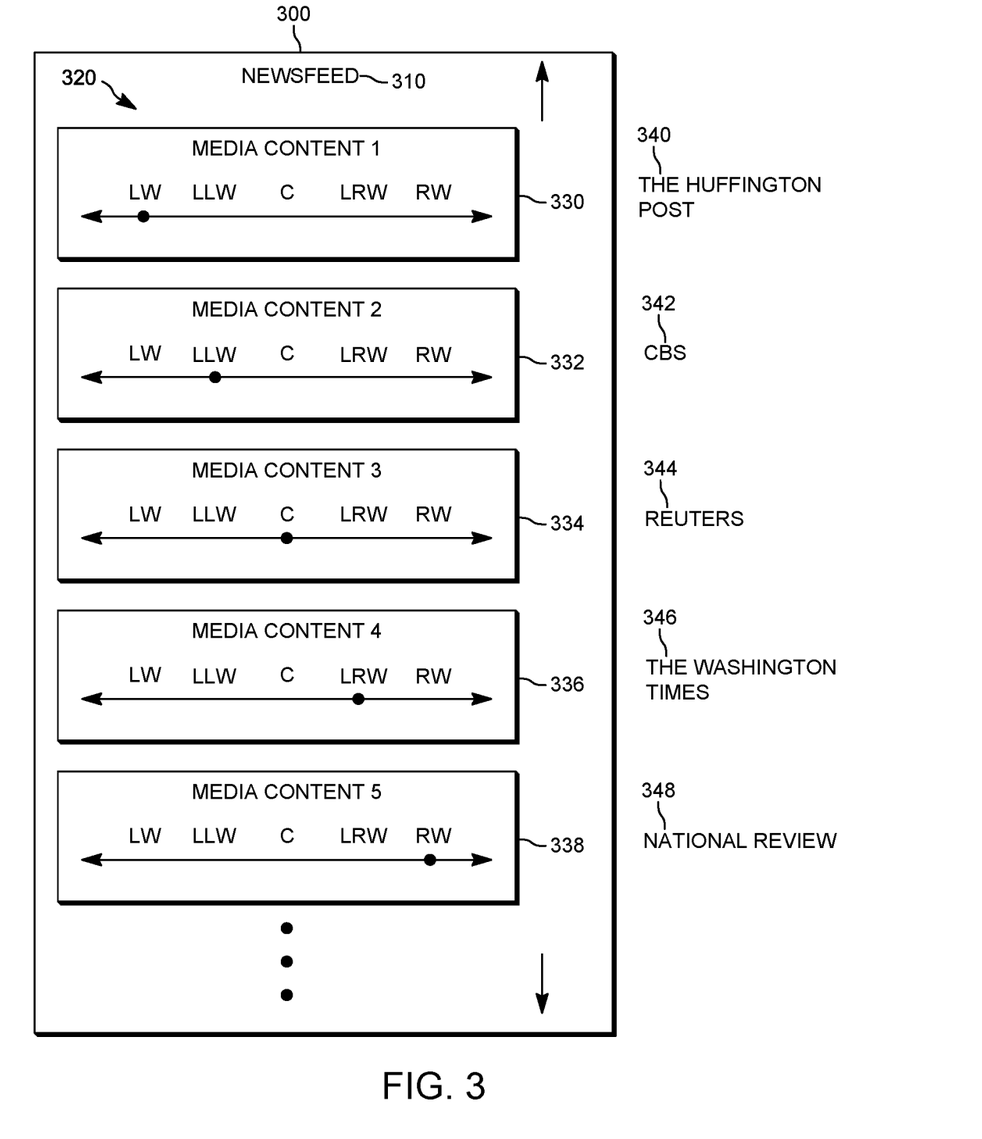
FIG. 3 illustrates a newsfeed for the personalized factual checking system.

Referring to FIG. 3, a display 300 may render a newsfeed 310 that includes a series of media content 320 for a user. The newsfeed 310 may include, for example, media content 1 330, media content 2 332, media content 3 334, media content 4 336, media content 5 338, etc. The media content 320 may be any suitable type of content, such as for example, video content, audio content, graphical content, and/or textual content. The newsfeed 310 is typically based upon obtaining content to be provided to the user from a plurality of different sources, including a media server 280. In many cases, the user may select one of the media contents 320 in the newsfeed 310 to view more of the selected content. The computing device 240 may determine the source of the media content, such as based upon a uniform resource locator (URL) or uniform resource identifier (URI) or otherwise determine the source of the content in any suitable manner. By way of example, media content 1 330 may be from The Huffington Post 340, media content 2 332 may be from CBS 342, media content 3 334 may be from Reuters 344, media content 4 336 may be from The Washington Times 346, and media content 5 338 may be from National Review 348. As it may be observed, The Huffington Post 340 may be considered left wing (see FIG. 1), CBS 342 may be considered leaning left wing (see FIG. 1), Reuters 344 may be considered centrist (see FIG. 1), The Washington Times 346 may be considered leaning right wing (see FIG. 1), and National Review 348 may be considered right wing (see FIG. 1).

Figure 4:
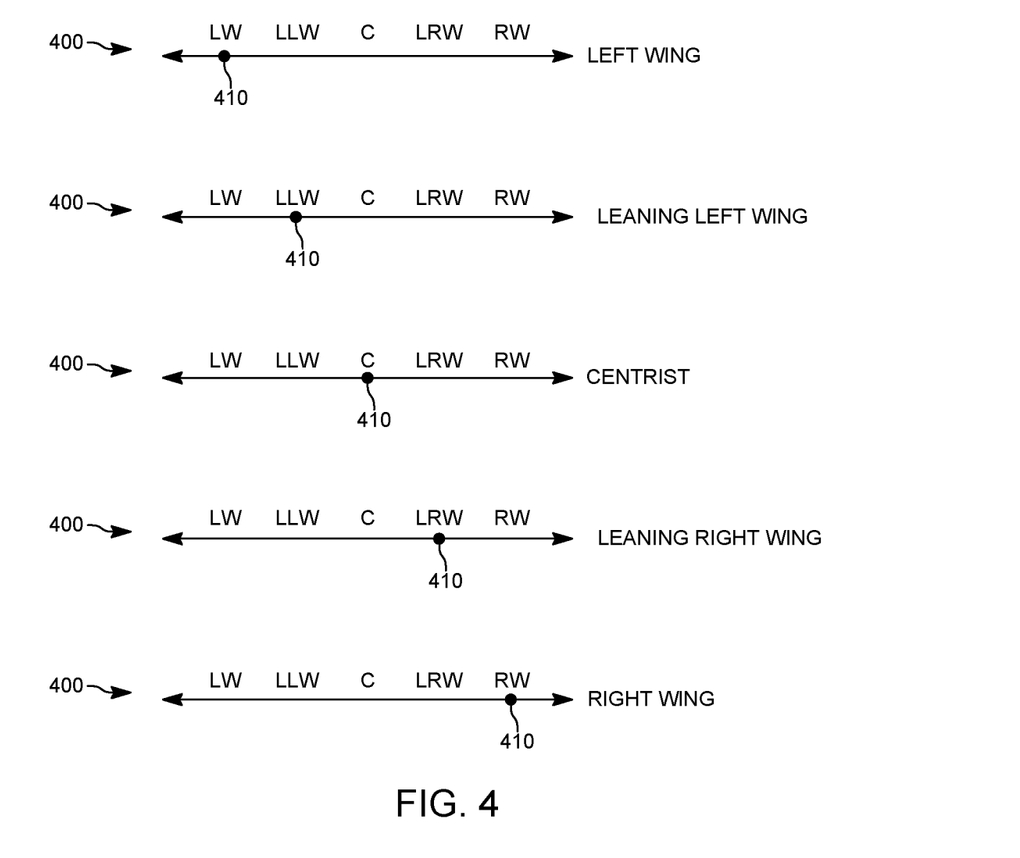
FIG. 4 illustrates an indicator for the newsfeed.

Referring to FIG. 4, the newsfeed 320 may include a graphical and/or textual indicator 400 of the factual bias of the underlying media content. By way of example, a combination graphical and textual icon 400 may be used, that includes LW (left wing), LLW (leaning left wing), C (centrist), LRW (leaning right wing), and RW (right wing). A bubble 410 may be selectively located along the indicator 400 to indicate the factual bias nature of the underlying media content to the user. The use of the graphical and/or textual indicator 400 provides a visible indicator that is readily observable by a user to indicate the nature of the underlying media content. The graphical and/or textual indicator 400 is preferably positioned next to each media content 320 to indicate the bias nature of the underlying media content to the user. In this manner, the user can readily determine the bias nature of the media content to assist in determining whether it is desirable to consume any particular content. The graphical and/or textual indicator may also be presented in any other suitable manner. For example, a number of tomatoes may be used, such as 1 to 4 tomatoes. For example, a different color may be used, such as red, blue, green. For example, the text of the media content may be presented in a different manner, such as a different color and/or font, to provide an indication.

Figure 5:
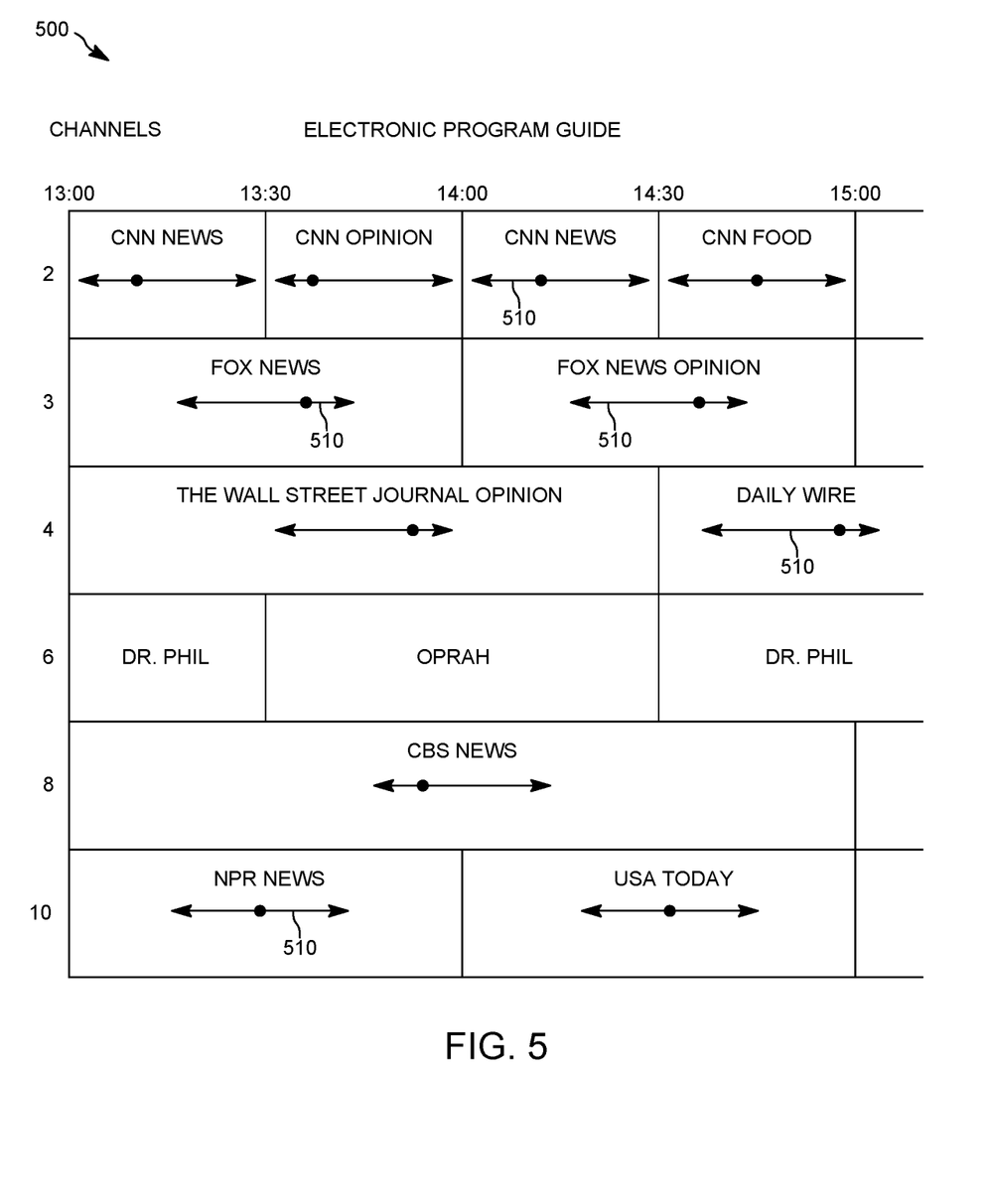
FIG. 5 illustrates an indicator for an electronic program guide.

Referring to FIG. 5, in another embodiment the display 260 may be in the form of a television that includes an electronic program guide 500. The electronic program guide 500 may indicate a set of past, current, and future available media content that may be tuned to by the user. Each of the media contents may include a graphical and/or textual indicator 510 that provides a visible indication that is readily observable by a user of the nature of the underlying media content. The graphical and/or textual indicator 510 is preferably positioned next to each media content to indicate the nature of the underlying media content to the user. In this manner, the user can readily determine the bias/factual nature of the media content to assist in determining whether it is desirable to consume any particular content.

In some cases, the user may desire to more fully understand the nature of the source data for the graphical and textual indicator which may be provided by including a link to the underlying data source, or other descriptive information, that is used to make the determination for the indicator. In this manner the link, which is selectable by the user, may provide details on why a particular source has a particular factual bias rating. Moreover, the link may indicate the source of the information so that the system is more transparent.

Figure 6:
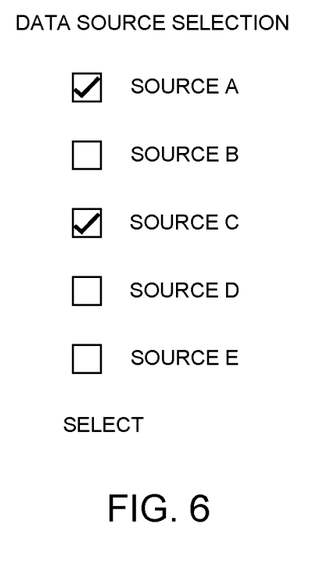
FIG. 6 illustrates a data source selection for the personalized factual checking system.

Referring to FIG. 6, with many factual rating related sources, there may be some inherent bias in the ratings based upon the source of the ratings. To permit the user to select a rating related source that is more in line with the user's bias, if any, it is desirable for the user to be able to select one or more available data sources to be used to determine the ratings that are rendered together with the media content.

Figure 7:
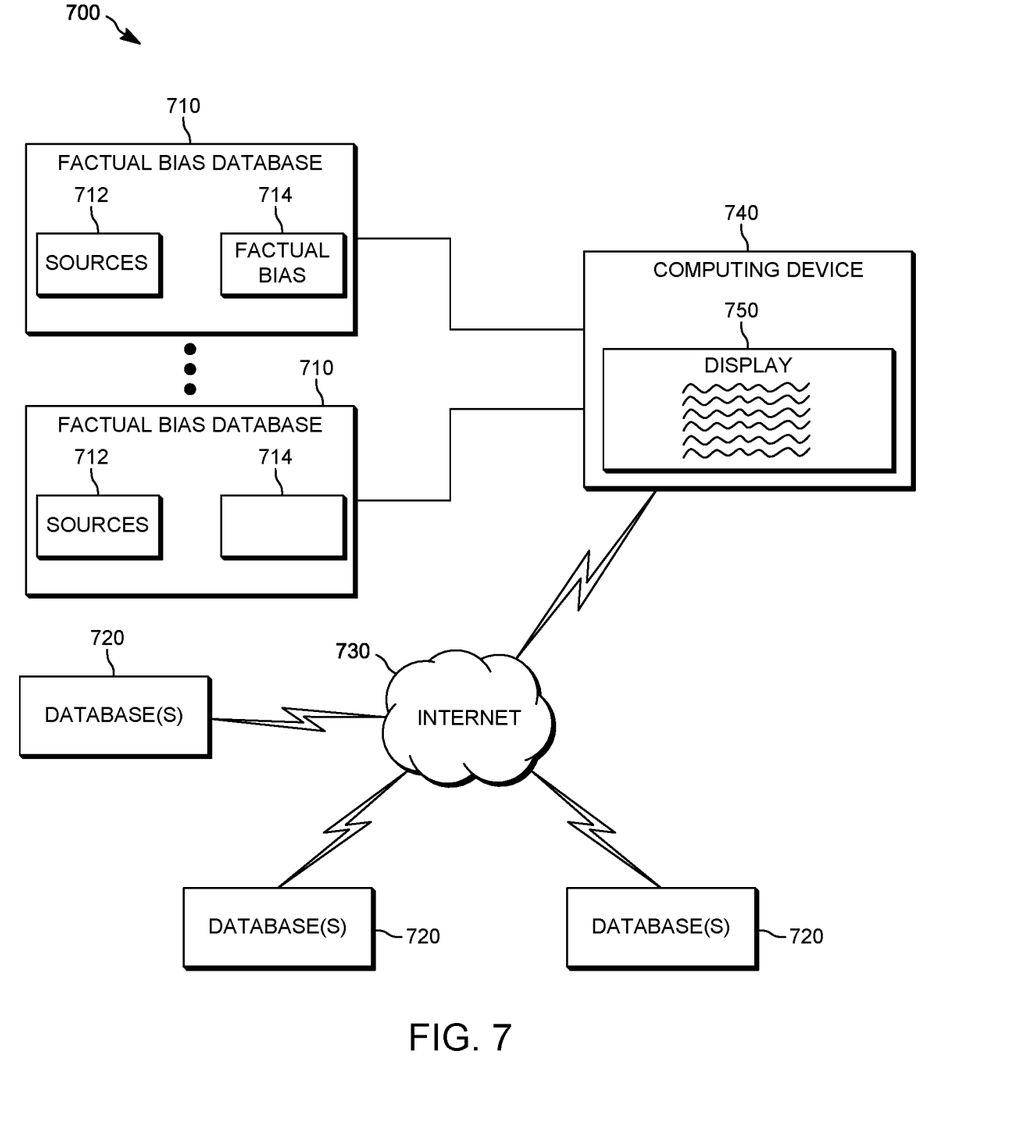
FIG. 7 illustrates another personalized factual checking system.

Referring to FIG. 7, a personalized factual checking system 700 for media content may include a plurality of factual bias databases 710 that each include a listing of media content sources 712, such as by name or by link, and an associated factual bias 714 for each name or link. The factual bias databases 710 may be updated on a periodic basis. The personalized factual checking system 700 for media content may use a plurality of network-based databases 720, such as accessible through the Internet 730. A user may use a computing device 740 that includes a processor, such as a mobile phone, a tablet, a laptop computer, a desktop computer, a television, a set top box, any of which in combination with a display 760, or otherwise, to access the media content 750 in combination with one or more of the databases 710, 720. The media content 750 may be obtained from any source, such as a network-based media server 780 accessible through the Internet 730. In addition, the computing device may be in the form of a server, such as a head end to a cable network, that provides information suitable to be rendered on a user's display device, such as a television. Preferably, the information to be rendered is in the form of an electronic programming guide (and/or includes any application that presents the content summary to the user).

The system may be integrated in any suitable manner, such as, may be software running on the device showing the media content and the graphical icon on the device, may be included within a browser showing the media content and the graphical icon on the device, may be included within a plug-in within a browser where the media content is rendered by the browser in a typical fashion with the graphical icon being overlaid on the rendered content, maybe an application within a mobile device, or may be an application within a mobile device with the graphical icon being overlaid on the rendered content.

In general, the bias may be determined based upon the multiple different databases that are selected by the user. For example, if a source is only included in a single database then that bias should be included. For example, if a source is included in multiple selected databases then that bias should be as a statistical measure of the available databases, such as the average.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A system for determining at least one of a factual truth measure and a bias of media content comprising:

(a) a factual bias database accessible by a computing device that includes a media set of media sources and a factual set of factual ratings, where each of said media sources of said media set includes an associated said factual rating of said factual set, wherein there are a plurality of different factual ratings, wherein there are a plurality of different media sources associated with each of said different factual ratings, wherein one of said media sources has a first subset of content that is associated with a first one of said different factual ratings, wherein said one of said media sources has a second subset of content that is associated with a second one of said different factual ratings;

(b) said computing device including a display associated therewith;

(c) said computing device receiving a plurality of media contents which are simultaneously rendered on said display;

(d) said computing device determining a source of each of said plurality of media contents, wherein a source of one of said plurality of media contents is associated with said first subset of content said associated with said first one of said different factual ratings which is rendered by the computing device with a first graphical icon, wherein a source of another one of said plurality of media contents is associated with said second subset of content said associated with said second one of said different factual ratings which is rendered by the computing device with a second graphical icon, where the first graphical icon for said first subset of content and said second graphical icon for said second subset of content identifying said one of said media sources are indistinguishable in their graphical appearance from one another when rendered, wherein said first graphic icon includes an associated third graphical icon indicating a first media channel for said media content, wherein said second graphical icon includes an associated fourth graphical icon indicating said first media channel for said media content, wherein said first subset of content and said second subset of content from said one of said media sources are provided by through said first media channel in the same manner;

(e) said computing device determining an associated said factual rating, including said first subset of content and said second subset of content, for each of said media contents based upon a respective said source;

(f) said computing device rendering a plurality of indicators including said first and second graphical icons, each of which is associated with a corresponding one of said plurality of media contents, indicating at least one of a factual truth measure and a bias of respective said media contents.

2. The system of claim 1 wherein said factual bias database is included in said computing device.

3. The system of claim 1 wherein said factual bias database is accessible through a network external to said computing device.

4. The system of claim 1 wherein said plurality of media contents are obtained from a network-based media server.

5. The system of claim 1 wherein said plurality of media contents are rendered as a newsfeed.

6. The system of claim 1 wherein said plurality of media contents are rendered as a website.

7. The system of claim 1 wherein said source is based upon a uniform resource identifier.

8. The system of claim 1 wherein said source is based upon a uniform resource locator.

9. The system of claim 1 wherein said indicator includes (1) left wing, (2) leaning left wing, (3) centrist, (4) leaning right wing, and (5) right wing indicating a respective said factual rating.

10. The system of claim 1 wherein said indicator includes different colors indicating said factual rating.

11. The system of claim 1 wherein said plurality of media contents are rendered as an electronic program guide or application presenting content or content summary to a user.

12. The system of claim 1 wherein a plurality of said factual bias databases is accessible to said computing device.

13. The system of claim 12 wherein said computing device selects which of said factual bias databases to use based upon a user selection or a default selection.

14. The system of claim 13 wherein each of said factual bias databases are accessed through the Internet.

* * * * *